United States Patent
Machon et al.

(10) Patent No.: US 10,329,400 B2
(45) Date of Patent: Jun. 25, 2019

(54) APPARATUS AND METHOD FOR THERMALLY DEMANUFACTURING TIRES AND OTHER WASTE PRODUCTS

(71) Applicant: PRTI, INC., Raleigh, NC (US)

(72) Inventors: Wayne Machon, Wake Forest, NC (US); Jason Williams, Raleigh, NC (US)

(73) Assignee: PRTI Global Management LLC, Franklinton, NC (US)

( * ) Notice: Subject to any disclaimer, the term of this patent is extended or adjusted under 35 U.S.C. 154(b) by 0 days.

(21) Appl. No.: 15/552,358

(22) PCT Filed: Jul. 26, 2017

(86) PCT No.: PCT/US2017/043704
§ 371 (c)(1),
(2) Date: Aug. 21, 2017

(87) PCT Pub. No.: WO2018/022609
PCT Pub. Date: Feb. 1, 2018

(65) Prior Publication Data
US 2018/0244889 A1 Aug. 30, 2018

Related U.S. Application Data

(60) Provisional application No. 62/366,827, filed on Jul. 26, 2016.

(51) Int. Cl.
*C08J 11/12* (2006.01)
*C08J 11/14* (2006.01)
(Continued)

(52) U.S. Cl.
CPC ............... *C08J 11/12* (2013.01); *B01D 45/16* (2013.01); *B01D 53/04* (2013.01); *B01J 19/24* (2013.01); *B29B 17/02* (2013.01); *C08J 11/14* (2013.01); *C10B 1/02* (2013.01); *C10B 1/04* (2013.01); *C10B 33/00* (2013.01); *C10B 49/02* (2013.01); *C10B 53/07* (2013.01); *C10G 3/40* (2013.01); *C10L 3/00* (2013.01); *B01D 2253/1122* (2013.01); *B01D 2257/302* (2013.01);
(Continued)

(58) Field of Classification Search
CPC .. C08J 11/12; C08J 11/14; C10G 3/40; C10B 33/00; C10B 49/02; C10B 53/07; C10B 1/02; C10B 1/04; C10L 3/00; B01D 45/16; B01D 53/04; B01J 19/24
See application file for complete search history.

(56) References Cited

U.S. PATENT DOCUMENTS

2006/0163053 A1*  7/2006  Ershag .................... C10B 47/16
                                                                   201/13

* cited by examiner

*Primary Examiner* — Brian A McCaig
(74) *Attorney, Agent, or Firm* — David Bradin; Nexsen Pruet, PLLC (57) ABSTRACT

An apparatus and process for thermally de-manufacturing tires and other materials. The apparatus is a retort chamber with various zones in which tires are combusted to provide energy for the thermal depolymerization reaction, depolymerization takes place, and products leave the retort chamber. In one embodiment, the process reacts water with iron present in steel-belted tires to produce hydrogen, which helps to break sulfur-sulfur bonds in vulcanized materials. The water also helps control the temperature of the reaction, which allows for control over the types and relative amounts of the various depolymerization products.

25 Claims, 5 Drawing Sheets

(51) Int. Cl.

| | |
|---|---|
| *C10B 1/02* | (2006.01) |
| *B01D 45/16* | (2006.01) |
| *B01D 53/04* | (2006.01) |
| *B01J 19/24* | (2006.01) |
| *B29B 17/02* | (2006.01) |
| *C10B 1/04* | (2006.01) |
| *C10B 33/00* | (2006.01) |
| *C10B 53/07* | (2006.01) |
| *C10G 3/00* | (2006.01) |
| *C10L 3/00* | (2006.01) |
| *C10B 49/02* | (2006.01) |
| *B29K 21/00* | (2006.01) |
| *B29L 30/00* | (2006.01) |

(52) U.S. Cl.
CPC .. *B01D 2257/304* (2013.01); *B01D 2257/308* (2013.01); *B01D 2259/40086* (2013.01); *B01J 2219/00058* (2013.01); *B01J 2219/24* (2013.01); *B29B 2017/0231* (2013.01); *B29K 2021/00* (2013.01); *B29L 2030/00* (2013.01); *C08J 2300/30* (2013.01); *C10L 2200/0469* (2013.01); *C10L 2290/02* (2013.01); *Y02P 20/143* (2015.11); *Y02P 30/20* (2015.11)

APPARATUS AND METHOD FOR THERMALLY DEMANUFACTURING TIRES AND OTHER WASTE PRODUCTS

FIELD OF THE INVENTION

The present invention relates to an apparatus and method for thermally de-manufacturing post-consumer and/or post-industrial rubber and/or plastic products, such as tires.

BACKGROUND OF THE INVENTION

There is a large interest in recycling waste materials, rather than storing them in landfills. This is particularly true with respect to used tires, a post-consumer waste product, and waste materials resulting from tire manufacture, a post-industrial waste product. Combustion of these materials can produce harmful gases, as they include sulfur crosslinks (a process known as vulcanization), which form hydrogen sulfide on combustion.

There are a variety of processes for depolymerizing the rubber in used tires, including those disclosed in EP 0694600 and U.S. Pat. No. 7,628,892. EP 0694600 discloses a process and a plant where used tires are depolymerized at relatively low pressure, and at a temperature between 100 and 135° C., to form gas and liquid products, which are subsequently combusted. The temperature is maintained by introducing water and air in the device.

U.S. Pat. No. 7,628,892 discloses a plant which includes a depolymerizing device, with a substantially cylindrical body, with an upper base, and a lower base. Thermal depolymerization of tires occurs inside the device, and a product mixture exits the device and then enters a phase separator, to separate out liquid products from gaseous products. The phase separator is connected to an aspiration unit, which enables the depolymerizing device to operate at pressures up to 10 mBar lower than atmospheric pressure. The process purportedly produces a carbonaceous fuel product, and a gaseous product which is burned.

The '892 patent also discloses adding calcium oxide to tires, such that, as the rubber in the tires is depolymerized in the presence of steam, the calcium oxide is converted to calcium hydroxide, which then reacts with sulfur, and forms a salt that then mixes with the steel and carbon recovered from the depolymerization process.

It would be advantageous to provide improved devices and processes for thermally de-manufacturing tires and other waste streams, which in some embodiments do not require added calcium salts to react with sulfur used in rubber vulcanization processes, and which allow for desulfurization to occur, if such is desired, outside of the retort chamber.

SUMMARY OF THE INVENTION

In one embodiment, the invention relates to an apparatus for thermally de-manufacturing used tires, waste material from tire manufacture, and other post-consumer and post-industrial waste.

The term "thermally de-manufacturing" refers to the thermal depolymerization of polymeric materials, and also to the de-manufacturing of non-polymeric components. By way of example, where a tire is thermally de-manufactured, it is possible to isolate organic materials produced as a result of the depolymerization process, and also inorganic materials, such as steel from steel belts, and sulfur used in the vulcanization process, where the sulfur can be isolated in the form of sulfur-containing compounds. Where inorganic fillers are used in filled polymeric articles of manufacture, the fillers can be isolated separately from the thermally depolymerized articles of manufacture.

The de-manufacturing apparatus comprises a retort chamber (also referred to herein as a retort), which, preferably, is oriented off the horizontal plane (e.g., in the vertical direction). The retort chamber can be of any desired shape, for example, a cylindrical or conical shape, with a diameter between about 1.5 and about 24 feet, more typically between about 4 and about 8 feet. The height of the retort chamber is typically between about 5 and 30 feet. The side walls of the retort chamber may be insulated to help maintain the operating temperature.

Further, as discussed in more detail below, combustion or partial combustion of materials at or near the bottom of the retort chamber can advantageously provide heat energy for carrying out thermal depolymerization at a position higher up in the retort chamber. When the retort is substantially vertical, it allows for material to flow downward as combustion or partial combustion takes place.

The inside of the retort chamber includes four different temperature zones, the locations of which can vary depending on a variety of factors, such as the oxygen and water content in the retort chamber, the reaction temperature and pressure, and the type of material being de-manufactured.

Briefly, it requires a significant amount of heat energy to initiate the thermal depolymerization of polymeric materials, such as tires. In some embodiments, this heat is provided externally, by heating the outside of the retort chamber, or, alternatively, by using microwave energy. In other embodiments, the heat energy is provided by partial combustion of tires or other polymeric materials at or near the bottom of the retort chamber. Partial combustion requires at least some oxygen, though the amount of oxygen added is purposefully kept below a stoichiometric amount required to fully combust the tires. Heat rises, and the heat produced by partially combusting a portion of the material at or near the bottom of the retort chamber rises up the retort chamber and provides the energy needed to depolymerize the tires and/or other polymeric materials present above the portion of the retort chamber where the heat is produced. Where water is added, it can be used to control the amount of heat, and the water may also react in the presence of high temperatures and, in some embodiments, steel from the tires, to form oxygen and hydrogen. The hydrogen can assist in de-vulcanizing the rubber in tires, forming hydrogen sulfide or other sulfur compounds, and can hydrogenate olefinic compounds. Catalysts can be added, if desired, to lower the activation energy required for those further reactions in which olefinic compounds produced in the depolymerization process may participate.

The composition of the materials being depolymerized, the temperature, pressure, and flow rate in the zone of the retort chamber in which these olefinic products are formed, and the presence or absence of catalysts, hydrogen, and/or water, can affect the product mixtures formed as the materials are depolymerized and initial products participate in further process steps.

In the first zone, which is at or near the bottom of the retort chamber, material is heated to a temperature between about 150 and about 550° C., more typically between about 150 and about 400° C. or about 250 and about 550° C., and combusted or partially combusted. Water, a catalyst, and/or oxygen can optionally be provided. Where oxygen is provided, it can be provided, for example, in pure form or as air, through a valve at or near the bottom of the retort chamber. Heat can be provided, for example, by introducing a burner through an opening in the wall of the retort chamber, at or near the bottom of the retort chamber. The heat produced by the combusting/partially-combusting the material is then used to reach a desired depolymerization temperature. Alternatively, the heat energy can be provided by providing the bottom of the retort chamber with a layer of refractory material, and heating the refractory material to a desired temperature using any of a variety of different heaters, such as induction heaters. In other embodiments, microwave energy is used to depolymerize the tires and/or other materials.

In one embodiment, the bottom of the retort chamber includes a series of registers, where oxygen and, optionally, water and/or a catalyst is introduced at one end of the series of registers, and flame from a burner is introduced at the other end of the series of registers. The burner can be placed on a carriage, which facilitates its movement through the retort. The registers are spaced so as to provide substantially equal pressure along the entire bottom of the retort. By "substantially equal" is meant that the pressure along the bottom of the retort chamber does not vary by more than 20%.

In operation, the reaction is moved toward the center, which provides a relatively constant rate of combustion to the materials being combusted, in contrast with merely introducing the burner to one end of the register.

In the first embodiment a number of ports are provided to permit the input of one or more of oxygen (for example, in pure form or as air), water, and/or catalysts, and the output of products, and to measure and manage rate of flow, temperature, and pressure.

In the second embodiment a number of input and output ports are used to create multiple zones for the refinement of solid, liquid and vapor creating multiple products.

In some embodiments, sulfur used to vulcanize the rubber in the tires is removed inside of the retort chamber, such as by reaction with a compound which forms a sulfide salt, and in other embodiments, sulfur is present in the product stream, where it is optionally, but preferably, removed before products are isolated. In one embodiment, a desulfurization unit is attached to the port, so that the products can be subjected to desulfurization conditions.

In one embodiment, a cyclone separator is used to remove particulates present in the vapor. If a desulfurization unit is used, the cyclone separator can be attached before or after the desulfurization unit, though is preferably attached before the desulfurization unit to minimize particulate contamination of the desulfurization unit.

While the products exiting the retort are in the gas phase, at room temperature, some products are liquid, and others are gaseous. The apparatus further includes a product separation unit, which includes one or more cooling towers, distillation towers, chillers, curtains of liquid through which gaseous streams can pass, and the like, to cool down the gas and separate the product mixture into one or more liquid and one or more gaseous products.

The thermal depolymerization is typically carried out under a vacuum, for example at pressures ranging from about −0.8 to about −200 millibars, more typically from about 0.8 to about −50 millibars. In order to achieve this vacuum, a vacuum pump or aspiration unit is attached at or near the end of the product separation unit. In one embodiment, the pressure can be increased up to about 8 millibars, particularly as gaseous products are evolved during the depolymerization process. These pressures can be reached, even when a vacuum is pulled, by off-gassing of various products. Control of the release of these products from the retort can help control the pressure.

The gas products can be isolated, or, if desired, combusted. If they are to be combusted, the apparatus can include a burner or generator after the vacuum pump or aspiration unit. The burner can be used to generate heat as the gas is burned, and the generator can be used to generate electricity as the gas is burned.

The top of the retort can be opened to load tires and/or other materials to be thermally de-manufactured into the retort. This can be accomplished by attaching the top to the remainder of the retort using a clam-shell hood, a hinge, a screw top, a series of flanges, and the like.

It can be desirable, between batches, to cool down the retort. While, in operation, water is typically added to the retort from a valve at or near the bottom of the retort, during cooling operations, water can also be or alternatively be added from a valve at or near the top of the retort. This can significantly accelerate the cool-down process, which allows the next batch to be processed faster than if water is not added from the top of the retort chamber. While not wishing to be bound to a particular theory, it is believed that when tires are thermally depolymerized, iron present in the steel belts reacts with carbon monoxide formed as a result of incomplete combustion (i.e., by using less than stoichiometric oxygen) and the water that is introduced to form hydrogen, in a manner analogous to that in the "steam-iron" process. The thus-formed hydrogen can break sulfur-sulfur and carbon-sulfur linkages present in the vulcanized rubber used in tires, and form hydrogen sulfide and other sulfur-containing products (including, but not limited to, COS).

Between batches, it is desirable to remove the leftover material from the retort. In the case of tires, leftover material can include carbon black and steel from the steel belts in the tires. There are several ways to remove leftover material from the retort. One exemplary way is to provide a hinge on the bottom of the retort, and unhinge the bottom after the material has been thermally depolymerized, thereby removing the material from the retort. Another way is to provide a hinge with a horizontal axis around the middle of the retort, and a motor for rotating the retort. After the top is removed, the retort can be rotated around the horizontal axis of the hinge. Materials collected at the bottom of the retort then drop out of the top of the retort. The retort can then be rotated back to the vertical position, and any pipes, valves, or other connections which were disconnected in order to rotate the retort can be reconnected.

In use, the retort is opened and tires and/or other materials to be thermally de-manufactured are introduced into the retort. The lid is closed, and gases and other volatiles are purged out of the system in a safe manner. For example, nitrogen or carbon dioxide gas can be flowed into the retort, and flowed out of the retort along with gases and other volatiles. These compounds can be captured under pressure, released to the atmosphere, or flared. A low pressure can then be applied. The system is completely sealed and no noxious or odor based vapors are permitted to escape.

The tires, or other material to be thermally depolymerized, that is at or near the bottom of the retort chamber is then heated up. Depending on the mechanism used to heat the material, this can involve introducing the burner to the bottom of the retort chamber, and bleeding in oxygen, water, and/or a catalyst through a valve so as to create a reaction with the material, or can involve introducing oxygen, water, and/or a catalyst to the bottom of the retort chamber, while also heating refractory material present at the bottom of the retort chamber.

The temperature in the retort is monitored. As the temperatures reach their appropriate ranges, gaseous products evolve from the port or ports. From there, the gaseous products can be subjected to a cyclone to remove particulates, a desulfurization step to remove hydrogen sulfide and other sulfur-containing products, and/or a cooling process to allow products which are liquid at room temperature to be separated from those which are gaseous at room temperature. The gaseous products can be collected and stored, burned, or used to generate electricity.

As the reaction proceeds, tires and/or other materials at or near the bottom of the retort chamber are consumed, and, using gravity, materials from higher above the consumed materials then proceed down the retort chamber until they are depolymerized.

After the reaction is complete, which can be judged, for example, by changes in temperature in the various zones, the reaction can be quenched, for example, by introducing water through a valve at or near the top of the retort chamber.

When the retort chamber has sufficiently cooled, the water can be drained. Ideally, the retort chamber is sealed during operations, so as to maintain the vacuum and comply with safety regulations. After each batch is complete, the seal can be broken, water drained from the retort chamber, and solid materials removed from the retort chamber.

In one embodiment, this involves opening a hinge at the bottom of the retort chamber to release the materials. In another embodiment, this involves removing the top, decoupling the outlet port, and rotating the retort around a hinge with a horizontal axis located at or near the middle of the retort. The materials then fall out of the top of the retort chamber, and the retort chamber can then be moved back to its original upright position.

The products obtained from thermally de-manufacturing tires tend to include carbon black, sulfur compounds, steel (from steel belts), a liquid, largely olefinic, fraction with properties similar to number 2 diesel, methane gas, a $C_{2-4}$ fraction, and one or more additional gases, such as carbon dioxide, carbon monoxide, sulfur dioxide and hydrogen. One or more of the olefins in the olefinic fraction can further react, for example, by undergoing Diels-Alder reactions with dienes such as butadiene (formed, for example, from the depolymerization of nitrile-butadiene rubber) to form cycloaliphatics, olefin dimerization/trimerization/oligomerization (with the same olefins or with two or more different olefins) to form larger olefins, hydrogenation to form aliphatics, and aromatization reactions. Removing the solid products from the retort chamber while they are still wet can facilitate the isolation of carbon black.

In addition to, or in place of, tires, other materials that can be de-manufactured include Banbury sludge, medical waste, wood based waste, oil based waste, plant matter, animal waste, human waste, fish waste, computer waste, printed circuit boards, "fluff" from the demolition of cars and asphalt extender.

The products resulting from the thermal de-manufacturing of these materials will vary from those obtained from tires, and the operating temperatures may be varied as well, depending on the appropriate temperatures at which the polymers undergo thermal depolymerization.

The present invention will be better understood with reference to the following detailed description.

DETAILED DESCRIPTION

In one embodiment, the invention relates to an apparatus for thermally de-manufacturing used tires, waste material from tire manufacture, and other post-consumer and post-industrial waste.

Definitions

As used herein, the term "retort chamber" refers to an airtight vessel in which substances are heated for a chemical reaction, producing gaseous products that may be collected in a collection vessel or used for further processing.

The term "thermally de-manufacturing" as used herein refers to the thermal depolymerization of polymeric materials, and also to the de-manufacturing of non-polymeric components. By way of example, where a tire is thermally de-manufactured, it is possible to isolate organic materials produced as a result of the depolymerization process, and also inorganic materials, such as steel from steel belts, and sulfur used in the vulcanization process, where the sulfur can be isolated in the form of sulfur-containing compounds. Where inorganic fillers are used in filled polymeric articles of manufacture, the fillers can be isolated separately from the thermally depolymerized articles of manufacture.

I. The Retort Chamber

The apparatus comprises a retort chamber (also referred to herein as a retort), which, preferably, is oriented in the vertical direction (or not horizontal—off the horizontal plane).

Shape of the Retort Chamber

The retort chamber can be of any desired shape, for example, a cylindrical or conical shape.

As discussed in more detail below, combustion or partial combustion of materials at or near the bottom of the retort chamber provides the heat energy for carrying out thermal depolymerization at a position higher up in the retort chamber. When the retort is substantially vertical, it allows for material to flow downward as combustion or partial combustion takes place.

Diameter of the Retort Chamber

The diameter of the retort chamber is important for carrying out the chemistry described herein. The diameter is typically between about 1.5 and about 24 feet, more typically between about 4 and about 8 feet. The height of the retort chamber is typically between about 5 and 30 feet. The side walls of the retort chamber are optionally insulated to help maintain the operating temperature.

While not wishing to be bound by a particular theory, it is believed that when the diameter is within the ranges provided above, the heat from the combustion of tires and/or other materials can flow through the retort chamber and heat other tires/other materials, such that they have sufficient heat energy to undergo thermal depolymerization.

Temperature Zones within the Retort Chamber

The inside of the retort chamber includes four different temperature zones, the locations of which can vary depending on a variety of factors, such as the oxygen and water content in the retort chamber, the reaction temperature and pressure, and the type of material being de-manufactured.

In the first zone, which is at or near the bottom of the retort chamber, material is heated to a temperature between about 900° C. and about 1300° C. and combusted or partially combusted. One or more of oxygen, water, and/or a catalyst can optionally be provided through a valve at or near the bottom of the retort chamber. Oxygen can be provided, for example, in pure form or as air.

A depolymerization zone overlies the first zone, and the chemistry occurs at a temperature between about 150 and about 550° C., for example, between about 150 and 400° C. or between about 250 and about 550° C.

Products leave the retort chamber at a zone higher than the depolymerization zone, and the temperature at which the products leave the retort chamber is typically between about 100 and 280° C.

Although it is possible to monitor the temperature within the actual depolymerization zone, it can be operationally easier to monitor the progress of the reaction by monitoring the temperature of the product mixture as it leaves the retort chamber through one or more outlet ports.

Near the top of the reactor, far from the intense heat provided at the bottom of the reactor, the temperature is typically in the range of about 60 to about 160° C.

The Bottom of the Retort Chamber

Heat can be provided to the first zone, for example, by introducing a burner through an opening in the wall of the retort chamber, at or near the bottom of the retort chamber. The heat produced by the combusting/partially-combusting the material is then used to reach a desired depolymerization temperature. Alternatively, the heat energy can be provided by providing the bottom of the retort chamber with a layer of refractory material, and heating the refractory material to a desired temperature using any of a variety of different heaters, such as induction heaters.

In one embodiment, the bottom of the retort chamber includes a series of registers, where the oxygen, air, water, and/or catalyst is introduced at one end of the series of registers, and flame from a burner is introduced at the other end of the series of registers. The burner can be placed on a carriage, which facilitates its movement through the retort. The registers are spaced so as to provide substantially equal pressure along the entire bottom of the retort. By "substantially equal" is meant that the pressure along the bottom of the retort chamber does not vary by more than 20%.

In operation, as the burner is moved along the carriage toward the center of the bottom of the retort chamber, the chemical reaction, namely, burning the tires and/or other materials, is moved toward the center. This provides a relatively constant rate of combustion to the materials being combusted, in contrast with merely introducing the burner to one end of the register.

Inlet/Outlet Ports

In the first embodiment a number of ports are provided to permit the input of one or more oxygen, air, water, and/or catalysts, and the output of products, and to measure and manage rate of flow, temperature, and pressure.

In the second embodiment a number of input and output ports are used to create multiple zones for the refinement of solid, liquid and vapor creating multiple products.

Inlet ports can be located at or near the bottom of the retort, so that oxygen/air can be provided, and water/steam can be provided. Water can also be provided through an inlet port at or near the top of the retort.

A valve is attached to each inlet port so as to control the amount of material that is input into the retort.

One or more outlet ports are located above the depolymerization zone, so that gaseous products can leave the retort and then be collected.

Desulfurization Unit

In one embodiment, a desulfurization unit is attached to the port, so that the products can be subjected to desulfurization conditions.

Desulfurization is a chemical process for removing sulfur from a material, such as the product stream from the thermal depolymerization process described herein.

As the product stream is formed, and exits the retort chamber, it is in the gas phase. When cooled, one or more products which are liquid at room temperature and atmospheric pressure and one or more products which are gases at room temperature and atmospheric pressure can be separately isolated.

In some embodiments, sulfur is removed from liquid products isolated from the gaseous product stream. In other embodiments, sulfur is removed from gaseous products isolated from the gaseous product stream, or from the gaseous product stream.

It can be easier to remove sulfur from the gaseous product stream than from separate liquid and gas streams, and for this reason, it can be advantageous to include the desulfurization unit at a point where the gaseous products first leave the retort chamber, i.e., before they have been cooled and separated.

Desulfurization conditions for removing sulfur from a gas stream are known to those of skill in the art.

Representative conditions are described, for example, in U.S. Pat. No. 7,687,047. In that patent, sulfur-containing gases containing $H_2S$ and COS are contacted with a sorbent comprising a substitutional solid solution characterized by the formula $Mn_ZZn_{(1-Z)}Al_2O_4$. Other sorbent beds include alumina and/or zinc oxide.

Where the goal is the simultaneous removal of COS, $SO_2$ and $H_2S$, a desulfurization process typically involves contacting the gas stream, which includes one or more of these sulfur compounds with a sorbent in a sorption zone to produce a product gas stream and a sulfur laden sorbent. These sorbents typically include zinc (Zn), and can also include a promoter metal, such as manganese, as well as a support, such as alumina. The sorbent, once saturated with sulfur, can be regenerated by contacting at least a portion of the sulfur-laden sorbent with a regeneration gas stream, in a regeneration zone, to produce a regenerated sorbent and an off-gas stream. At least a portion of the regenerated sorbent can then be returned to the sorption zone. Where the regeneration of the sorbent produces $SO_2$, the gas can be contained in an appropriate storage tank, or reduced to form elemental sulfur.

In addition to or in place of removing sulfur, in one embodiment, a dehalogenation unit is used to remove chlorine or other halogens from the gas stream. Reductive dehalogenation using heterogeneous catalytic and electrolytic methods can dehalogenate chlorinated gas-phase contaminants while avoiding the generation of trace contaminants like dioxins because of the absence of oxygen. Due to the electronegative character of halogen substituents, heavily chlorinated aliphatics are thermodynamically disposed for reductive dehalogenation by electron donors such as elemental hydrogen (for example, reacting the gas with hydrogen in the presence of a platinum, palladium, or rhodium catalyst, optionally present on a carbon, alumina, zeolite, silica, titanium oxide, or zirconium oxide support media). Chlorines can also be reacted with transition metals to form covalent bonds.

Cyclone Separator/Particulate Removal

In one embodiment, a cyclone separator is used to remove particulates present in the vapor. If a desulfurization unit is used, the cyclone separator can be attached before or after the desulfurization unit, though is preferably attached before the desulfurization unit to minimize particulate contamination of the desulfurization unit.

As used herein, cyclonic separation is a method form removing particulates from the gaseous product stream, without using filters, through vortex separation. A gas cyclone is used, and rotational effects and gravity are used to separate the solids from the gases. The method can also be used to separate fine droplets of liquid from a gaseous stream.

A high speed rotating airflow is established within a cylindrical or conical container called a cyclone. Air flows in a helical pattern, beginning at the top (wide end) of the cyclone and ending at the bottom (narrow) end before exiting the cyclone in a straight stream through the center of the cyclone and out the top.

Relatively large and dense particles in the rotating stream have too much inertia to follow the tight curve of the stream. When they strike the outside wall, they fall to the bottom of the cyclone where they can be removed. In a conical system, as the rotating flow moves towards the narrow end of the cyclone, the rotational radius of the stream is reduced, thus separating smaller and smaller particles. The cyclone geometry, together with flow rate, defines the cut point of the cyclone, i.e., the size of particle that will be removed from the stream with a 50% efficiency. Particles larger than the cut point will be removed with a greater efficiency, and smaller particles with a lower efficiency.

An alternative cyclone design uses a secondary air flow within the cyclone to keep the collected particles from striking the walls, to protect them from abrasion. The primary air flow containing the particulates enters from the bottom of the cyclone and is forced into spiral rotation by stationary spinner vanes. The secondary air flow enters from the top of the cyclone and moves downward toward the bottom, intercepting the particulate from the primary air. The secondary air flow also allows the collector to optionally be mounted horizontally, because it pushes the particulate toward the collection area, and does not rely solely on gravity to perform this function.

Those of skill in the art of oil refining know how to use cyclonic separation, as similar separators are used in the oil refining industry to separate catalyst particles from gaseous product mixtures.

Product Separation/Cooling Unit

While the products exiting the retort are in the gas phase, at room temperature, some products are liquid, and others are gaseous. The apparatus further includes a product separation unit, which includes one or more heat exchangers, cooling towers, distillation towers, chillers, curtains of liquid through which gaseous streams can pass, and the like, to cool down the gas and separate the product mixture into one or more liquid and one or more gaseous products.

In some embodiments, efforts are taken to collect as much of the product stream as possible which is liquid at room temperature and atmospheric pressure, and in other embodiments, efforts are taken to separate one or more liquid products from each other.

In some embodiments, efforts are taken to collect as much of the products as possible which are gaseous at room temperature and atmospheric pressure in a single product stream, and in other embodiments, efforts are taken to separate one or more gas products from each other.

Generally, hydrocarbon products with five or more carbons in their chains (i.e., $C_{5+}$ hydrocarbons) are liquid at room temperature. Gas products typically include one or more of carbon monoxide, carbon dioxide, hydrogen gas, hydrogen sulfide, sulfur dioxide, methane, ethane, ethylene, propane, propylene, butane, and butylenes. Those hydrocarbon products with from two to four carbons in their chains (i.e., $C_{2-4}$ hydrocarbons) can be separated from other gas products, for example, using a de-methanizer column. Those products with from three to four carbons can be separated from those products with two carbons, for example, using a de-ethanizer column. Alternatively, the gaseous products, which tend to have a relatively high BTU value, can be burned and used to generate heat energy or electricity, as desired.

The gaseous product stream can initially pass through one or more heat exchangers, such as a condenser, to lower the temperature of the gas stream, and obtain a first liquid product stream and a second gas stream, which is made up of the components that did not liquefy in the first cooling step.

This liquid product stream can be pumped to a location downstream from where the gas is initially cooled, and used to create a curtain of cooled liquid, which can then be contacted with the second gas stream. This will cool the second gas stream, and provide a second liquid product stream which includes the initially-collected liquids, and those liquids obtained by cooling the second gas stream. This process can be repeated as desired.

Generally, the first products separated from the gaseous product stream are those with the largest molecular weights, and the last products separated from the gaseous products stream are those with the smallest molecular weights.

The amounts of liquid products and gaseous products will vary depending on the nature of the feedstock and the reaction conditions. However, the total liquid product content (i.e., the "oil content" in tire rubber that is thermally depolymerized using the apparatus and techniques described herein typically ranges from about 31 to about 41% by weight of the tires. The methane content is typically around 25%.

Figure 1:
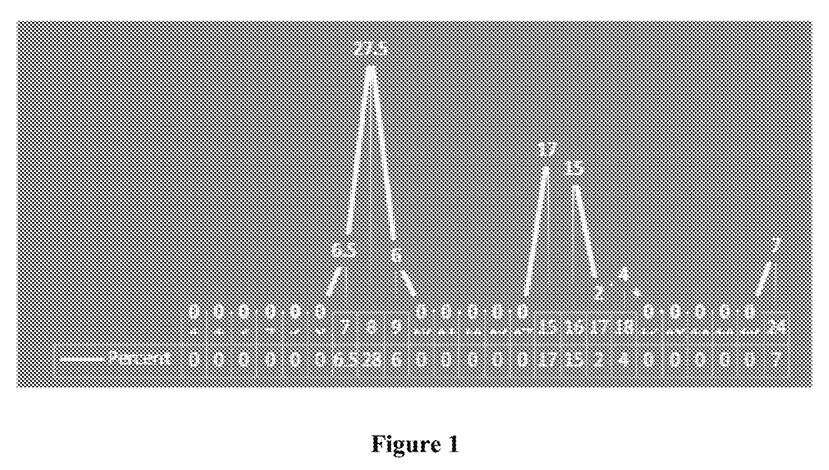
FIG. 1 is a chart showing the composition of an oil prepared by the thermal depolymerization process described herein.

A representative product distribution is shown in FIG. 1. There is a significant product fraction with between about 6 and 9 carbons (i.e., a $C_{6-9}$ fraction), a significant fraction with between 14 and 17 carbons (i.e., a $C_{14-17}$ fraction), and a modest fraction above $C_{24}$. In this particular product distribution, on information and belief, the polymers in the tires being depolymerized were formed from monomers with these chain lengths, which would explain why there is little material with sizes in the $C_{10-13}$ range. Products lighter than $C_5$ are present in the gas phase, and were not subject to being analyzed. If operated at different temperatures and pressures, for example, at higher temperatures and/or pressures, than those used to create this particular product stream, the olefins in this initial product stream can further react to form olefin dimers/trimers/oligomers, can participate in Diels-Alder reactions with butadiene or other dienes to form cycloaliphatics, can become hydrogenated to form aliphatics, can undergo aromatization reactions to form aromatics, and the like.

As the boiling points of a $C_{6-9}$ fraction, a $C_{14-17}$ fraction, and a $C_{24+}$ fraction are so dissimilar, it is within the skill of those in the art to cool the product mixture and separate these types of fractions.

In order to manage the costs, it can be advantageous to use heat exchangers and curtains of liquid product as at least part of the product isolation unit.

Vacuum Pump/Aspiration Unit

The thermal depolymerization is carried out under a vacuum, which is typically on the order of between about −0.8 to about −200 millibar, more typically between about −6 to about −10 millibar. In order to achieve this vacuum, a vacuum pump or aspiration unit is attached at or near the end of the product separation unit. In some embodiments, the pressure can increase to up to around 8 millibar, particularly as gaseous products are produced.

The gas products can be isolated, or, if desired, combusted. If they are to be combusted, the apparatus can include a burner (flare) or generator after the vacuum pump or aspiration unit. The burner can be used to generate heat as the gas is burned, and the generator can be used to generate electricity as the gas is burned.

Cooling the Retort Chamber

It can be desirable, between batches, to cool down the retort. In operation, water is typically added to the retort from a valve, attached to an inlet port, at or near the bottom of the retort. During cooling operations, water can also be or alternatively be added from a valve, attached to an inlet port, at or near the top of the retort. This can significantly accelerate the cool-down process, which allows the next batch to be processed faster than if water is not added from the top of the retort chamber.

Temperature Monitoring

There are a variety of ways to monitor temperature inside a reactor, such as the inside of a retort chamber. Examples include temperature gauges, thermocouples, thermometers, and/or thermostats. Thermometers can be preferred in those zones where the products of the thermal depolymerization leave the retort chamber (i.e., above the depolymerization zone), as the temperature typically ranges from about 100 to about 280° C., and these are temperatures which can be measured using a thermometer. However, near the bottom of the reactor, where temperatures exceed about 900° C., and in the depolymerization zone itself, where temperatures are between 250 and 550° C., a thermocouple may be a preferred way to measure the temperature.

Top of the Retort Chamber

The top of the retort can be opened to load tires and/or other materials to be thermally de-manufactured into the retort. This can be accomplished by attaching the top to the remainder of the retort using a clam-shell hood, a hinge, a screw top, a series of flanges, and the like.

The top of the retort chamber can be equipped with one or more inlet ports, and valves attached to the ports, to allow water to flow into the retort. Alternatively, the inlet port(s) and valve(s) can be positioned below the actual top of the retort chamber, but in the upper third of the retort, so that the valves/ports do not have to be detached when the top is opened, non-combusted materials are removed, and the next batch of materials to be depolymerized is added.

Removal of Solid Material from the Retort

Between batches, it is desirable to remove the leftover solid material from the retort. In the case of tires, leftover material can include carbon black and steel from the steel belts in the tires. There are several ways to remove leftover material from the retort. One exemplary way is to provide a hinge on the bottom of the retort, and unhinge the bottom after the material has been thermally depolymerized, thereby removing the material from the retort.

Another way is to provide a hinge with a horizontal axis around the middle of the retort, and a motor for rotating the retort. After the top is removed, the retort can be rotated around the horizontal axis of the hinge. Materials collected at the bottom of the retort then drop out of the top of the retort. The retort can then be rotated back to the vertical position, and any pipes, valves, or other connections which were disconnected in order to rotate the retort can be reconnected.

II. Materials that can be Thermally De-Manufactured

In one embodiment, tires are the material being thermally de-manufactured. The tires can come from the tire manufacturer (i.e., post-industrial waste), from a landfill (i.e., post-consumer waste), or both. In some aspects of this embodiment, tire scrap includes un-vulcanized rubber.

Where tires come from a tire manufacturer, the monomers resulting from thermal depolymerization can be returned to the manufacturer, as can the steel belts from steel-belted tires. Where the tires come from a landfill, the product mixtures can be used to generate one or more products with a higher value, and lower volume, than the tires. Where a desulfurization unit is used, the products will have a low sulfur content, and the amount of sulfur released into the environment will be significantly lower than if tires were merely burned.

In some embodiments, the tires are added to the retort chamber intact, and in other embodiments, the tires are cut into two or more pieces, and the pieces added to the retort chamber.

When tires are stacked inside the retort chamber, there is a significant amount of empty space that can be filled, for example, with other materials to be depolymerized. A reasonable amount of void volume should remain, so that the heat can be transferred from the bottom of the retort chamber to the depolymerization zone. Ideally, the amount of void space that can be filled is less than 75% by volume, more typically less than about 50% by volume, and still more typically, less than about 25% by volume.

In addition to, or in place of, tires, other materials that can be de-manufactured include un-vulcanized rubber, Banbury sludge, medical waste, wood based waste, oil based waste, plant matter, animal waste, human waste, fish waste, computer waste, printed circuit boards, "fluff" from the demolition of cars and asphalt extender.

The products resulting from the thermal de-manufacturing of these materials will vary from those obtained from tires, and the operating temperatures may be varied as well, depending on the appropriate temperatures at which the polymers undergo thermal depolymerization.

III. Thermal De-Manufacturing Process

In the process described herein, the top of the retort chamber is opened, and tires and/or other materials to be thermally depolymerized are added. Typically, the tires are stacked on top of each other, from the bottom to the top of the retort. This way, as the tires near the bottom are combusted to provide heat energy for the depolymerization reaction, tires stacked above the tires that are combusted can fall down, thus providing fresh feedstock for combustion, and a continuous source of heat for the depolymerization reaction.

In some embodiments, the thermal depolymerization is carried out under vacuum, as the gases could explode if contacted with air at high temperatures, and, as thermal depolymerization follows the principles of Le Chatelier's Principle, namely, that to convert a polymer molecule to many monomer molecules, a vacuum is favored, whereas to convert many monomer molecules to a polymer molecule, pressure is favored. Typically, to ensure that the air and any volatile gases are removed, a nitrogen or carbon dioxide atmosphere is established, for example, through an inlet port, and then a vacuum is applied, using the vacuum pump or other means described herein for providing a vacuum.

Gases and other volatiles which flow out of the retort can be captured under pressure, released to the atmosphere, or flared depending on process, cost and value.

The use of nitrogen, carbon dioxide, or other inert gases is optional, and establishing a vacuum is optional. Typically, the pressure at which the thermal depolymerization is carried out is between about −0.8 and about −200 millibars, more typically between about −6 and about −10 millibars. The system is completely sealed and little or no noxious or odor based vapors are permitted to escape.

Once air and volatile gases are purged, and a vacuum can be established, heat is added to the bottom of the reactor, heating the bottom row of tires and/or other material to be thermally demanufactured to a temperature between about 900 and 1300° C. This can be done using any suitable means, such as by using an induction heater, heating refractory material, using burners, and the like.

One particularly efficient way of introducing this heat is to have a series of registers at or near the bottom of the retort chamber. A combustion agent, such as air or oxygen can be introduced at one end of the series of registers, and flame from a burner can be introduced at the other end of the series of registers. The burner can be placed on a carriage, which facilitates its movement through the retort. The registers can be spaced so as to provide substantially equal pressure along the entire bottom of the retort. By "substantially equal" is meant that the pressure along the bottom of the retort chamber does not vary by more than 20%.

Once the tires reach this temperature, they will combust, and produce heat. A steady stream of air or oxygen is maintained, added through an inlet port at or near the bottom of the reactor. Because the oxygen is present at a low concentration, and is consumed by the smoldering tires, this does not significantly increase the pressure.

Once the desired temperature is reached, heat will flow upward, and cause thermal depolymerization of the tires and/or other materials. The desired temperature range for thermal depolymerization of the rubber present in the tires is between around 100 and 280° C., though at the higher end of this temperature range, products with lower molecular weights tend to be formed, and at the lower end of this temperature range, products with higher molecular weights tend to be formed.

Water is also added, typically through in inlet port at or near the bottom of the reactor. The water allows one to have some control over the reaction temperature. While not wishing to be bound to a particular theory, it is also believed that when tires are thermally depolymerized, iron present in the steel belts reacts with carbon monoxide formed as a result of incomplete combustion (i.e., by using less than stoichiometric oxygen) and the water that is introduced to form hydrogen, in a manner analogous to that in the "steam-iron" process. The thus-formed hydrogen can break sulfur-sulfur and carbon-sulfur linkages present in the vulcanized rubber used in tires, and form hydrogen sulfide and other sulfur-containing products (including, but not limited to, COS).

The process described herein is unique, in that it allows one to have some degree of control over the product distribution. For example, if it is desired to produce methane as a major product, the depolymerization reaction can be run at a relatively higher temperature, and if it is desired to isolate more of the monomers, the depolymerization reaction can be run at a relatively lower temperature.

Regardless of the temperatures at which the bulk of the depolymerization takes place, the temperature will tend to rise when the reaction nears completion.

The temperature in the retort is monitored during the thermal depolymerization step. The temperature can be monitored at multiple locations within the retort chamber. For example, the combustion/smoldering of tires and/or other material at or near the bottom of the reactor can be monitored to ensure that the temperature stays in the range of 800-1300° C., more typically, 900-1300° C. The temperature in the depolymerization zone can be monitored to ensure that the temperature stays in the range of between about 150 and 550° C., more typically, between about 250-550° C. or between about 150 and 450° C., and/or the temperature of the products leaving the retort chamber can be monitored to ensure that the temperature stays in the range of between about 100 and about 280° C.

As the temperatures reach their appropriate ranges, gaseous products evolve from the port or ports. From there, the gaseous products can be subjected to a cyclone to remove particulates, a desulfurization step to remove hydrogen sulfide and other sulfur-containing products, and a cooling process to allow products which are liquid at room temperature to be separated from those which are gaseous at room temperature. The gaseous products can be collected and stored, burned, or used to generate electricity.

The cooling process can be adjusted as desired, to combine all of the gas and all of the liquid products, or to separately isolate one or more liquid fractions and/or one or more gas fractions.

As the reaction proceeds, tires and/or other materials at or near the bottom of the retort chamber are consumed, and, using gravity, materials from higher above the consumed materials then proceed down the retort chamber until they are depolymerized.

After the reaction is complete, which can be judged, for example, by changes in temperature in the various zones, the reaction can be quenched, for example, by introducing water through a valve at or near the top of the retort chamber.

When the retort chamber has sufficiently cooled, the water can be drained, and solid materials can be removed from the retort chamber.

In one embodiment, this involves opening a hinge at the bottom of the retort chamber to release the materials. In another embodiment, this involves removing the top, decoupling the outlet port, and rotating the retort around a hinge with a horizontal axis located at or near the middle of the retort. The materials then fall out of the top of the retort chamber, and the retort chamber can then be moved back to its original upright position.

Products of Thermal De-Manufacturing of Tires

The products obtained from thermally de-manufacturing tires tend to include carbon black, sulfur compounds, steel (from steel belts), a liquid, largely olefinic, fraction with properties similar to number 2 diesel, methane gas, a $C_{2-4}$ fraction, and one or more additional gases, such as carbon dioxide, carbon monoxide, sulfur dioxide and hydrogen. As discussed above, in some embodiments, the olefins in the olefinic fraction can further react to form dimers, trimers, and oligomers, cycloaliphatics, aliphatics, and/or aromatics. Removing the solid products from the retort chamber while they are still wet can facilitate the isolation of carbon black.

EXAMPLES

The present invention will be better understood with reference to the following non-limiting example.

Figure 2:
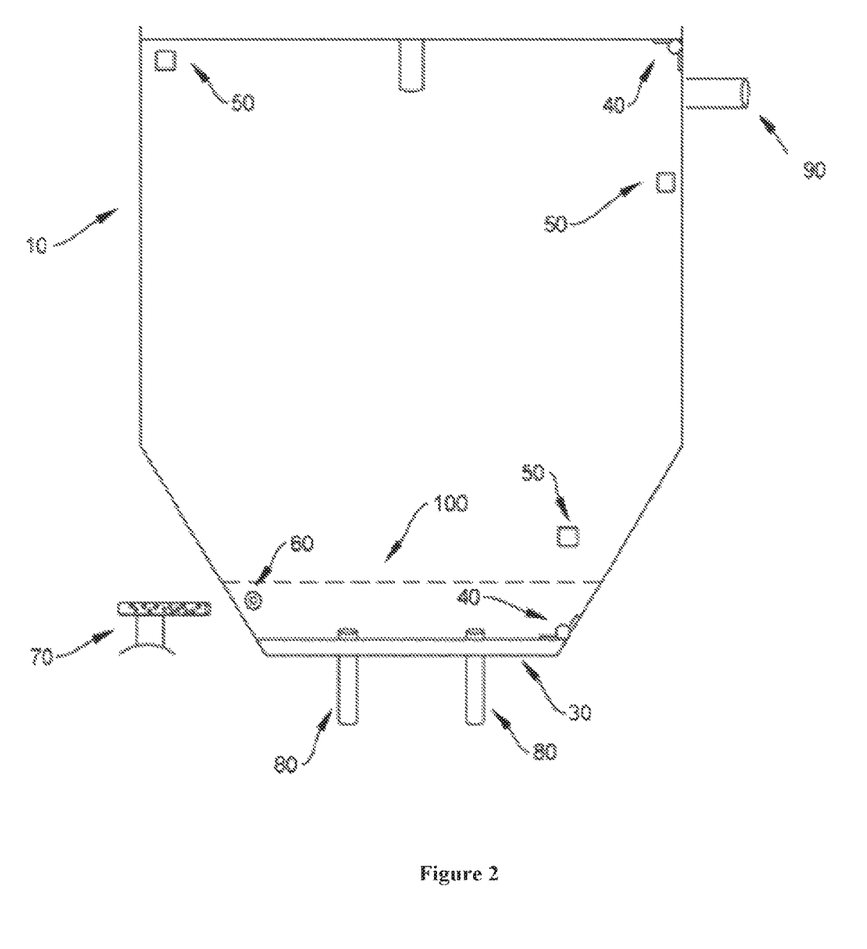
FIG. 2 is a schematic illustration of one embodiment of the retort chamber described herein.

FIG. 2 is a schematic illustration of one embodiment of the retort chamber described herein. The retort chamber (10) includes a top (20), a bottom (30), a hinge (40) at the top and/or the bottom, to enable the user to insert material to be thermally depolymerized and/or to remove inorganic material and other remnants which remain following the thermal depolymerization process, temperature sensors (50) near the top, near the bottom, and between the top and the bottom of the retort chamber, a carriage (60) for receiving a burner (70), two inlet ports (80) near the bottom of the retort chamber, and one inlet port (80) near the top of the retort chamber, and an outlet port (90) between the top and the bottom of the retort chamber. Along the bottom, in line with and above the burner, is a register (100). The material to be thermally depolymerized overlies the register.

In use, material to be thermally depolymerized is introduced to the retort chamber (10), ideally by opening the hinge (40) at the top of the retort chamber (10), which hinge (40) is closed after the material is introduced. Oxygen or air is inserted through one of the bottom inlet ports (80), and the burner (70) is introduced through the carriage (60). The oxygen/air passes through a register (100), which allows for substantially even heating as the burner (70) and oxygen travel along the bottom of the reactor (20) and over the register (100).

The amount of oxygen/air is insufficient to result in rapid combustion of the material to be combusted. Instead, this results in the partial combustion, or smoldering, of the bottom layer of the material to be combusted (such as tires). The temperature at or near the bottom (30) of the retort (10) is monitored using a temperature sensor (50), so as to remain in the range of between about 900 and 1300° F. Water is added to the retort (10) through a second inlet port (80) at or near the bottom of the retort (20. The water may react with iron to form hydrogen and iron oxide, for example, where the material to be thermally depolymerized comprises tires, and the tires comprise steel belts.

As the thermal depolymerization takes place, the temperature in the middle of the retort chamber rises to a desired range, as measured by a second thermal sensor (50), and a thermal depolymerization product is produced. This material exits the retort (10) through an exit port (90).

The temperature at or near the top of the reactor (20) can be measured using a third temperature sensor (50).

When the reaction is complete, the retort can be cooled by adding more water through the inlet port (80) at or near the bottom of the reactor, and, optionally, through the inlet port (80) at or near the top of the reactor (20). Inorganic material and other material that is not consumed in the depolymerization reaction can be removed, for example, by opening a hinge (40) near the bottom of the reactor.

Figure 3:
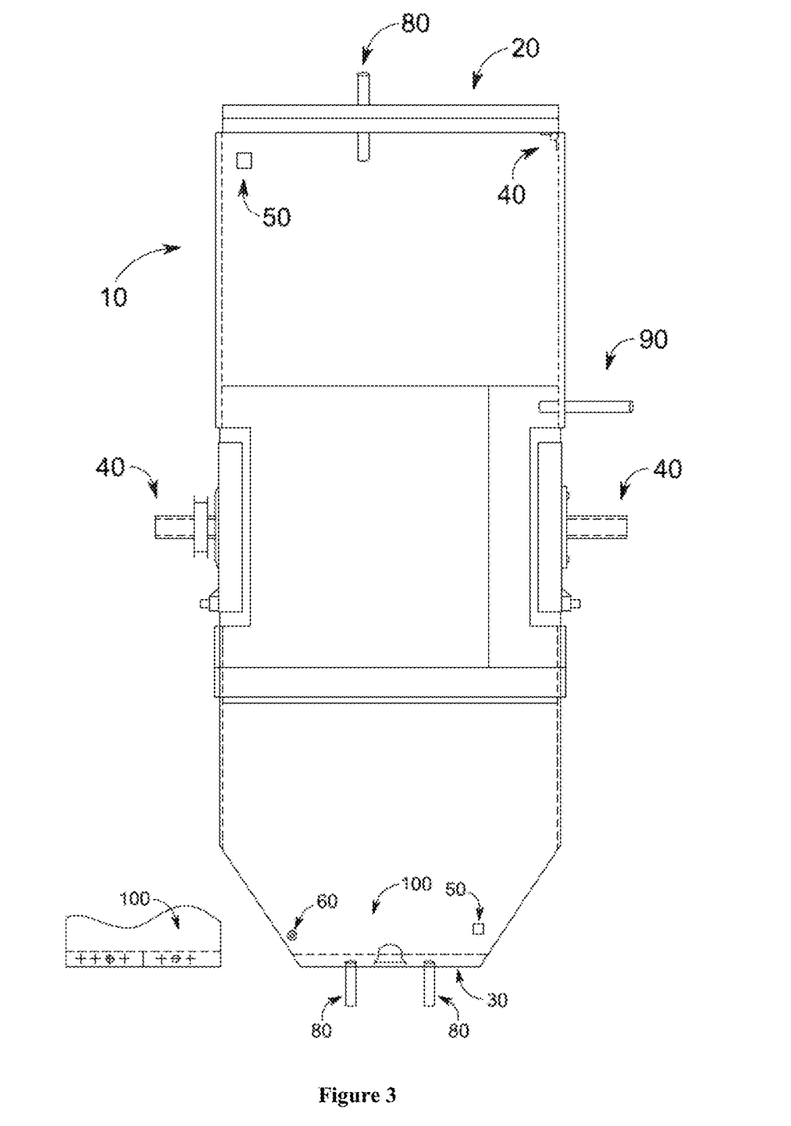
FIG. 3 is a schematic illustration of another embodiment of the retort chamber described herein.

FIG. 3 is a schematic illustration of another embodiment of the retort chamber described herein. In this embodiment, as with the previous embodiment, the retort chamber (10) includes a top (20) and bottom (30), temperature sensors (50), a carriage (60) for a burner (not shown), inlet ports (80) at the bottom (30) and top (20) of the retort (10), an outlet port (90), and a register (100). However, in addition to hinge (40) at or near the top (20) of the retort (10), there are hinges (40) at or near the middle of the retort chamber (10), which permit the retort (10) to be rotated. In use, the retort is used in substantially the same way as the embodiment shown in FIG. 2. However, when the thermal depolymerization step is completed, the remnants can be removed by opening the top of the retort (20) and rotating the retort (10) using the hinges at or near the middle of the retort (40).

Figure 4:
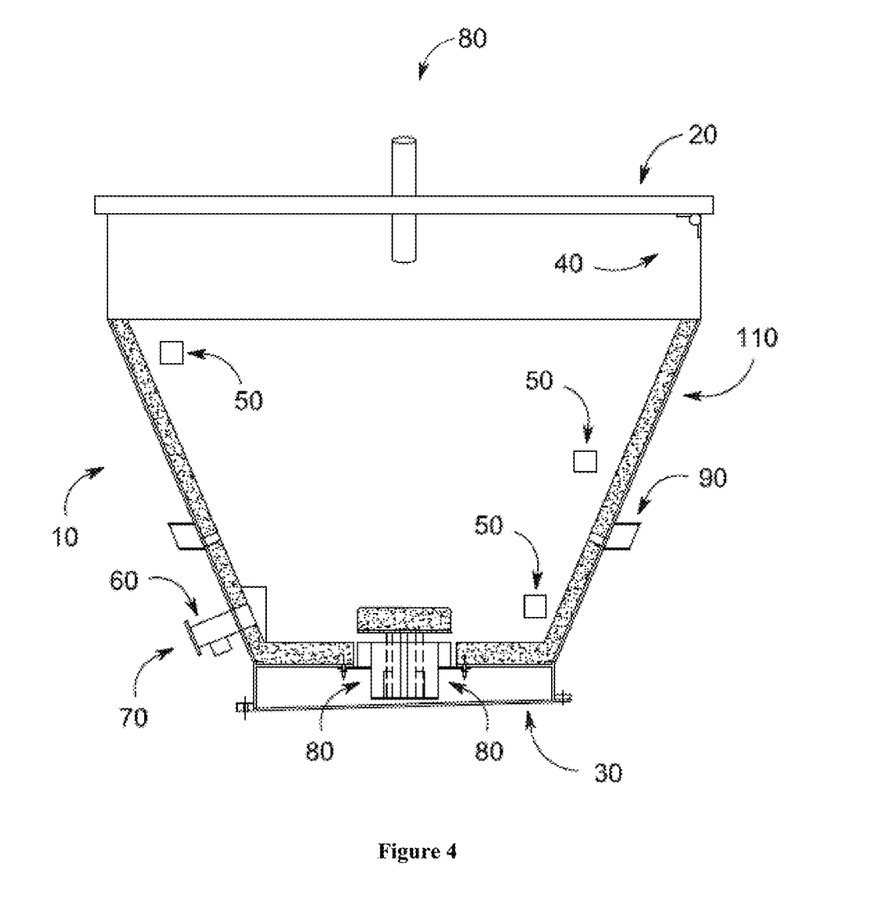
FIG. 4 is a cutaway view of the retort chamber described herein.

FIG. 4 is a cutaway view of the retort chamber described herein. As with the other figures, the retort (10) includes a top (20) and bottom (30), a hinge at or near the top (40), inlet ports (80) at the bottom and top of the retort, and temperature sensors (50) at or near the top and bottom, and between the top and bottom, of the retort. A burner (70) is partway inserted into the carriage (60). The sides of the retort (10) are shown as being filled with refractory material (110).

Figure 5:
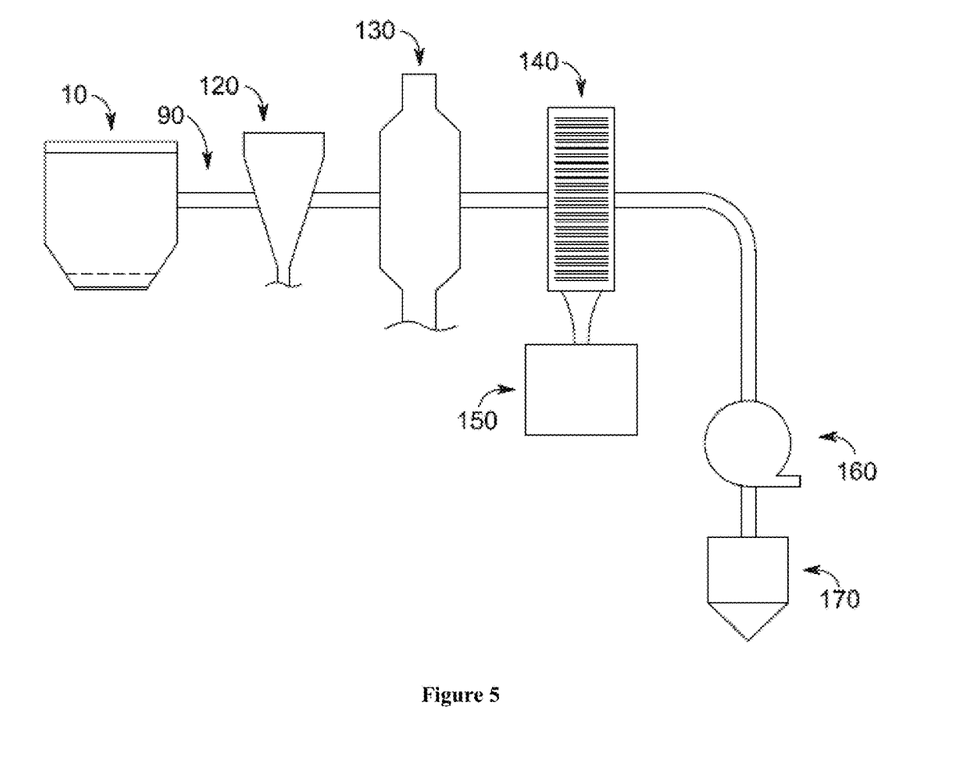
FIG. 5 is a schematic illustration of one embodiment of an apparatus to collect products as they leave the retort chamber.

FIG. 5 is a schematic illustration of one embodiment of an apparatus to collect products as they leave the retort chamber. The retort chamber (10) is connected to an outlet port (90), and the products are optionally passed through a cyclone chamber (120) to remove solid particulates and/or a desulfurization chamber to desulfurize the materials while they are still in the gas phase. The optionally desulfurized material passes through one or more chilling/condensation units (140), and material that liquefies is collected in one or more collection vessels (150). The depolymerization reaction is carried out under vacuum, and vacuum is achieved using a vacuum pump (160). The vacuum pump (160) is, indirectly, connected to the retort (10) through the intervening cyclone chamber chilling/condensation units (140), optional desulfurization chamber (130), optional cyclone (120) and exit port (10). Gaseous material passes through the chilling/condensation units (140) and through the vacuum pump (160), where it is optionally flared using a flare (170).

In other embodiments, not shown, the gaseous materials can be passed through a demethanization column, and the $C_{2-4}$ products collected under pressure. The $C_1$ and lower products (methane, carbon dioxide, carbon monoxide, hydrogen, and the like) can be bottled under pressure, if desired, for later use, as an alternative to being flared. Direct release of these gases to the atmosphere is undesirable.

Various publications are cited herein, the disclosures of which are incorporated by reference in their entireties for all purposes.

The present invention is not to be limited in scope by the specific embodiments described herein. Indeed, various modifications of the invention in addition to those described will become apparent to those skilled in the art from the foregoing description and accompanying figures. Such modifications are intended to fall within the scope of the appended claims.

The invention claimed is:

1. A retort chamber comprising:
   a) a top,
   b) a bottom,
   c) a heater at or near the bottom of the retort chamber capable of heating the bottom to a temperature between about 900 and 1300° C.,
   d) two or more inlet ports located at or near the bottom of the retort chamber,
   e) one or more outlet ports located at or near the top of the retort chamber,
   f) temperature monitors at or near the top and bottom of the retort chamber,
   g) a temperature monitor located at a position between about 30 and about 70% of the distance between the top and the bottom of the retort chamber, and
   h) a vacuum line or aspirator located in the upper third of the retort chamber.

2. The retort chamber of claim 1, wherein the heater is a burner placed on a carriage, which carriage is adapted to allow the burner to move along the bottom of the retort chamber.

3. The retort chamber of claim 1, wherein the bottom of the retort chamber comprises a plurality of registers, which registers are spaced so as to provide substantially equal pressure along the entire bottom of the retort, wherein substantially equal means that the pressure along the bottom of the retort chamber does not vary by more than 20%.

4. The retort chamber of claim 1, wherein one or more of the inlet ports is adapted to receive a supply of water to be introduced into the retort chamber.

5. The retort chamber of claim 1, further comprising one or more inlet ports at or near the top of the retort chamber, which inlet ports are adapted to receive a supply of water to be introduced into the retort chamber.

6. The retort chamber of claim 1, wherein one or more of the inlet ports is adapted to receive a supply of air or oxygen to be introduced into the retort chamber.

7. The retort chamber of claim 1, wherein the bottom is hinged, and, when open, allows for material to be removed from the retort chamber.

8. The retort chamber of claim 1, wherein the top is hinged, and, when open, allows for material to be inserted into or removed from, the retort chamber.

9. The retort chamber of claim 8, further comprising a hinge with a horizontal axis, adapted to allow the retort chamber to rotate, allowing for material to be removed from the retort chamber when the lid is open and the retort chamber is rotated such that the top of the retort chamber is lower than the bottom of the retort chamber.

10. The retort chamber of claim 1, further comprising a desulfurization unit attached to one of the outlet ports.

11. The retort chamber of claim 1, further comprising a cyclone unit attached to one of the outlet ports, wherein the cyclone unit is adapted to remove particulates from a gaseous product stream exiting the outlet port.

12. The retort chamber of claim 1, further comprising a chilling or condensation unit attached to one of the outlet ports, which chilling or condensation unit is adapted to receive and cool a product stream that is in the gas phase at the temperature at which it enters the chilling or condensation unit, and, when cooled, at least a portion of the product stream is in the liquid phase.

13. The retort chamber of claim 12, wherein the vacuum line or aspirator is attached to the chilling or condensation unit.

14. A process for thermally de-manufacturing tires and/or other materials, comprising:
   a) loading the retort chamber of claim 1 with tires and/or other materials,
   b) purging the retort chamber of volatiles and air, such that a vacuum in the range of between approximately −0.8 and −200 millibars is present in the retort chamber,
   c) heating a portion of the tires and/or other materials at or near the bottom of the retort chamber to a temperature between about 900 and 1300° C., and
   d) thermally depolymerizing the tires and/or other materials to form a product stream which exits the retort chamber through one of the outlet ports, which product stream is in the gas phase while exiting the retort chamber, while maintaining the temperature in the zone where the products leave the retort chamber at a temperature between about 100 and 280° C.

15. The process of claim 14, wherein the pressure is between about −6 and −8 millibars.

16. The process of claim 14, wherein the temperature is maintained by adding water and/or air or oxygen through two or more of the inlet ports.

17. The process of claim 14, wherein the tires to be thermally de-manufactured comprises steel-belted tires, and wherein water reacts with the steel in the steel-belted tires at a temperature between about 900 and 1300° C. to form hydrogen.

18. The process of claim 17, wherein the tires comprise vulcanized rubber which comprises sulfur-sulfur and/or sulfur-carbon linkages, and the hydrogen breaks the sulfur-sulfur and/or sulfur-carbon linkages in the vulcanized rubber.

19. The process of claim 14, further comprising subjecting the product stream to desulfurization conditions.

20. The process of claim 14, further comprising subjecting the product stream to a cyclone to remove particulates.

21. The process of claim 14, wherein the product stream comprises one or more products which are liquid at room temperature and atmospheric pressure, and one or more products which are gaseous at room temperature and atmospheric pressure,
   further comprising subjecting the product stream to a chiller or condenser unit, so as to condense a portion of the products which are liquid at room temperature and atmospheric pressure.

22. The process of claim 14, wherein the tires and/or other material being thermally de-manufactured undergo a thermal depolymerization reaction in that part of the reactor between where the temperature is between about 900 and about 1300° C., and where the temperature is between about 100 and about 280° C.

23. The process of claim 22, wherein the tires being burned at or near the bottom of the reactor provide heat energy for the thermal depolymerization step.

24. The process of claim 14, wherein the temperature of the thermal depolymerization step, and accordingly, the product composition, is controlled by adjusting an amount of water and/or air or oxygen through the two or more inlet ports.

25. The process of claim 14, wherein, after the thermal depolymerization step is complete, the retort chamber is cooled by introducing water into the retort chamber through an inlet port at or near the top of the retort chamber and/or one or more of the inlet ports at or near the bottom of the retort chamber.

* * * * *